Sept. 7, 1954 L. M. HOLTZ 2,688,688
REPLACEABLE VEHICLE LAMP UNIT
Filed July 22, 1949 3 Sheets-Sheet 1
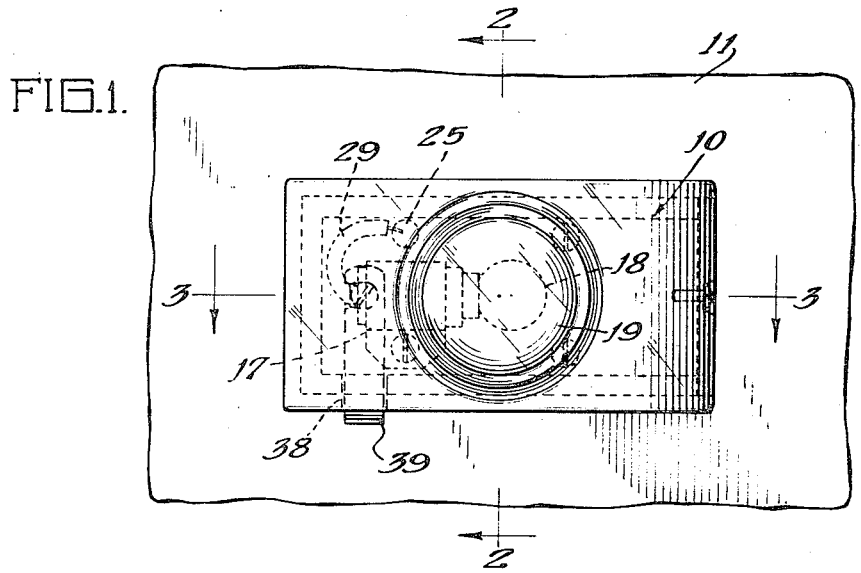
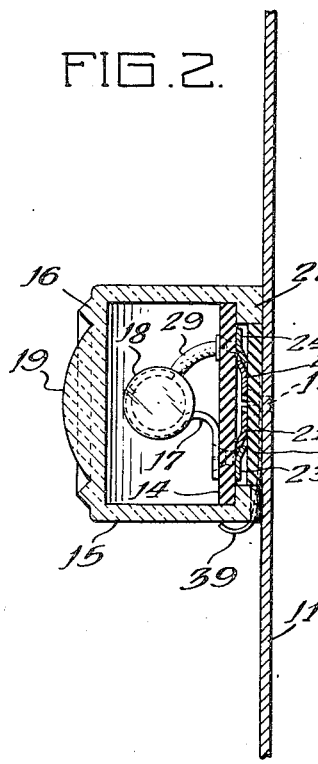
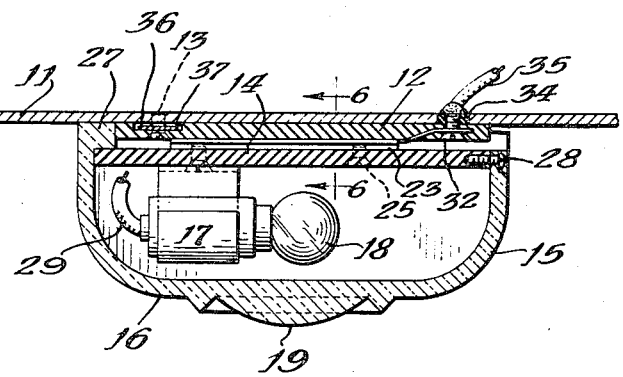
Inventor:
Louis M. Holtz
By: Zahl & Gutbaugh
Attorneys Sept. 7, 1954   L. M. HOLTZ   2,688,688
REPLACEABLE VEHICLE LAMP UNIT
Filed July 22, 1949   3 Sheets-Sheet 2

Inventor:
Louis M. Holtz
By Zahl & Gritzbaugh
Attorneys

Sept. 7, 1954 L. M. HOLTZ 2,688,688
REPLACEABLE VEHICLE LAMP UNIT
Filed July 22, 1949 3 Sheets-Sheet 3
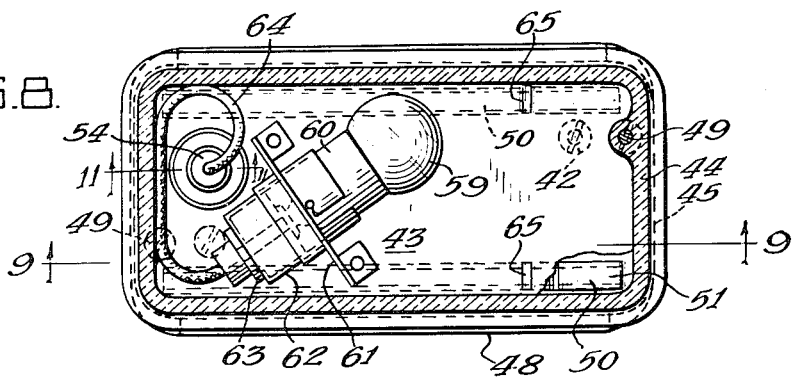
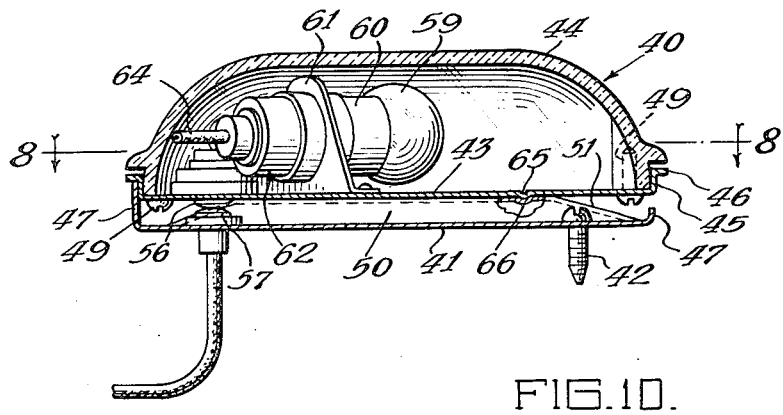
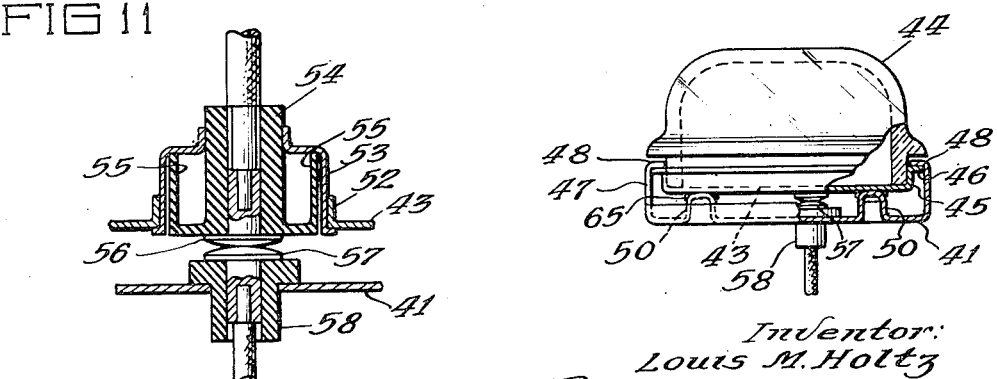
Inventor:
Louis M. Holtz
By: Zahl & Gutzbaugh
Attorneys Patented Sept. 7, 1954

2,688,688

UNITED STATES PATENT OFFICE 2,688,688

REPLACEABLE VEHICLE LAMP UNIT

Louis M. Holtz, Chicago, Ill.

Application July 22, 1949, Serial No. 106,145

2 Claims. (Cl. 240—7.1)

This invention relates to vehicle lights and in particular to a structure which provides a self-contained, easily replaceable lamp unit together with cooperating means for mounting the same on the body of a vehicle.

The invention is particularly applicable to clearance lights and tail lights for trucks, trailers and other vehicles, although the invention is applicable to other types of lights and electrical appliances, which are to be replaceably mounted on a wall or other supporting means.

It is an object of this invention to provide means for removably mounting a lamp unit on a support and which also serves to establish electrical contact between the lamp and the source of power associated with the support.

Another object of this invention is to provide a combined support and contact means of the character described which permits both the electrical and mechanical connection to be established or to be broken by a single movement of the lamp unit.

It is a further object to provide a combined support and contact means which operates by a wedging action, thereby providing good electrical contact even though the contact members are located in a position wherein they may be exposed to grease and dirt.

A still further object is to provide a tail light, a clearance light or the like, which is in the form of a replaceable unit which includes the lamp bulb and the housing therefor. Thus, when the bulb burns out, the unit as a whole may be replaced and a fresh unit readily inserted without the necessity of having to remove the housing and replace the lamp bulb.

Trucks and trailers are required to carry clearance lights at the rear of the body, as well as the usual tail light. The clearance lights are generally mounted in a row of three, although sometimes there are more. Due to vibration and the fact that a given truck is oftentimes in use for almost twenty-four hours a day, bulb failure occurs much more frequently than it does in the usual passenger car. Also the fact that there are at least four of these small wattage bulbs on each truck, the probability that at least one bulb will fail during a given run is reasonably great. Therefore, the truck drivers have to carry spare bulbs and the installation of a given bulb consumes an appreciable amount of time due to the necessity of removing the lamp housing in order to replace the bulb. Furthermore, the means by which the lamp housing is attached to the body frequently become coated with dirt or grease which renders the operation of replacement of the bulb more time-consuming.

According to the present invention, the truck driver carries a stock of fresh replaceable units, and the operation of replacing can be accomplished in considerably less time than one minute, since only a single sliding movement is required for effecting both the electrical and mechanical contact.

Still another object is to provide a replaceable light unit of few parts which lends itself readily to low cost mass production.

Other objects, features and advantages will become apparent as the description proceeds.

With reference now to the drawings in which like reference numerals designate like parts:

Fig. 1 is an elevation of a preferred embodiment of my invention;

Fig. 2 is a vertical section taken along line 2—2 of Fig. 1;

Fig. 3 is a horizontal section taken along line 3—3 of Fig. 1;

Fig. 8 is an elevation of a modified form of my invention; the housing being shown in section along line 8—8 of Fig. 9;

Fig. 9 is a bottom horizontal section taken along line 9—9 of Fig. 8;

Fig. 10 is an end view of Fig. 8; and

Fig. 11 is an enlarged section taken along line 11—11 of Fig. 8.

Figure 6:
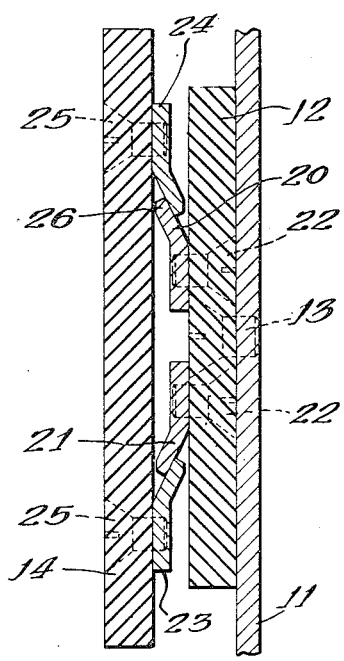
Fig. 6 is an enlarged section taken along line 6—6 of Fig. 3.
Figure 7:
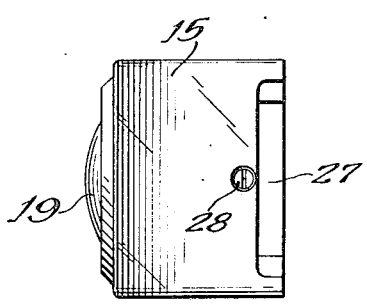
Fig. 7 is an end view of the housing shown in Fig. 5.

The lamp unit is designated generally by the reference numeral 10, and is mounted on the wall portion 11 of a vehicle body or some other suitable supporting means. A mounting plate 12 is secured to the wall portion 11 by means of screws 13, 30 and 32 as shown in Figs. 3 and 6. The lamp unit includes a base plate 14 and a housing 15, the latter including a transparent wall 16. The housing is preferably an integral unit molded from a transparent plastic material with the result that the top, bottom and side walls will also be transparent. The mounting plate 12 and the base plate 14 are formed from insulating material, such as Bakelite.

A lamp socket 17 is suitably mounted on the base plate 14 and carries a lamp 18. The transparent wall 16 may be shaped to form a bull's-eye 19 or other refracting means which are customarily employed in clearance lights and tail lights, the bull's eye being located opposite the lamp bulb 18.

Figure 5:
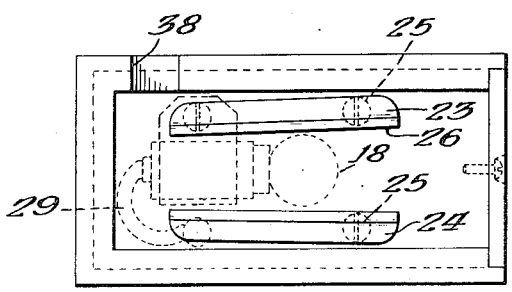
Fig. 5 is a rear elevation of the lamp unit.

Disposed on the mounting plate 12 are two elongate contact members, hereinafter sometimes referred to as mounting contacts 20 and 21. These are secured to the mounting plate 12 by means of screws 22, as shown in Fig. 6. A pair of somewhat similar elongate contact members, hereinafter sometimes referred to as unit contacts 23 and 24, are secured to the base plate 14 by means of screws 25 as shown in Figs. 3, 5 and 6. The mounting contacts 20 and 21 extend in the same general direction as do the unit contacts 23 and 24, in order that sliding movement between the two pairs may be effected.

The unit contacts 23 and 24 are provided with oppositely disposed edge portions 26 which are offset from the plane of the bottom surface of the base member, or they may otherwise be shaped so as to provide portions which may be slidably engaged by the mounting contacts 20 and 21, in interlocking relationship. The mounting contacts are spaced closer to each other than are the unit contacts, and are also provided with oppositely disposed edge portions 26 which bear against the edge portions of the unit contacts and serve to establish electrical contact between the two. In this particular embodiment, the unit contacts are insulated from each other so that the cooperating contact members of each pair, 20, 24 and 21 and 23, respectively, may be utilized to establish electrical connection with both terminals of the lamp bulb and the power source. Where a metal base plate is used, and the unit contacts are not insulated from each other, the construction herein shown may be utilized to establish connection between one terminal of the lamp bulb and the power source, other means being provided to establish connection between the other terminal and the power source as will be pointed out hereinafter.

As shown in the drawings, the contact members are disposed not exactly parallel to each other, but preferably at a slight angle to each other in order to obtain a wedging action in a direction parallel to the plane of the base and the mounting plates. However, they may be otherwise shaped to provide a wedging action in a plane perpendicular to the plane of the base and mounting plates. This wedging action provides a good electrical contact even though the contact members might be coated with dirt or grease.

The housing 15 is formed with an inwardly directed flange 27 which extends around three of the four walls thereof and which forms a seat for the base plate 14. The base plate 14 is secured in place by means of a screw 28 which passes through the fourth wall of the housing and takes into the edge of the base plate.

The base of the socket 17 is secured to the base plate 14 by means of one of the screws 25 as shown in Figs. 2 and 3, thereby providing electrical connection between one terminal of the lamp bulb 18 and the unit contact 23. A conductor 29 provides an electrical connection between the other terminal of the lamp bulb 18 and the unit contact 24, the ends of the conductor 29 being soldered to the lamp terminal and to one of the screws 25 respectively. Thus, the lamp bulb 18 is electrically connected across the two unit contacts 23 and 24.

Figure 4:
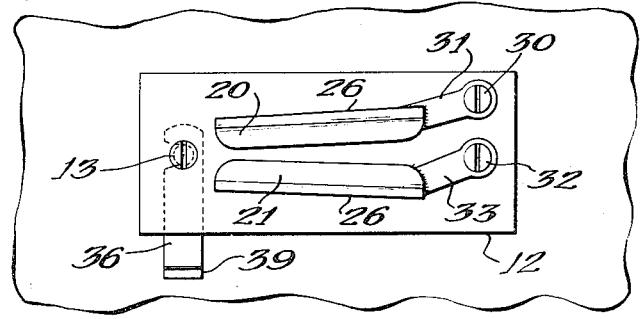
Fig. 4 is an elevation of the mounting plate.

Mounting contact 20 is connected to mounting screw 30 by means of a conducting strip 31, as shown in Fig. 4. Similarly mounting contact 21 is connected to mounting screw 32 by means of a conductor strip 33. The mounting screws 30 and 32 preferably extend through bushings 34 provided in the wall portion 11, and serve as means to which an external circuit may be connected. The external circuit may include one or more conductors 35 as shown in Fig. 3 and a source of power, such as a battery, not shown herein. Alternatively, one of the mounting screws 30 or 32 may be grounded to the wall portion 11 provided that the latter is steel, and the circuit completed by the grounding of one of the battery terminals.

A latch 36 is provided to lock the lamp unit against sliding movement in the event that it is not wedged into position with sufficient force. As shown in Fig. 4, one end of the resilient strip from which the latch 36 is formed is disposed between the mounting plate 12 and the wall portion 11 and is held in place by the screw 13. The underside of the mounting plate is cut away at 37 to permit resilient movement of the latch in a direction perpendicular to the plane of the wall portion 11. The outer end of the latch engages a notch 38 formed in the flange 27 of the housing 15. The outer end of the latch 36 is bent up to provide a button 39. To remove the lamp unit, the button 39 is depressed which frees the lamp unit and permits it to be slid to the left and removed from engagement with the mounting plate 12.

The strips can be very firmly secured to the plates, thereby providing a combined electrical and mechanical connection which is capable of supporting a comparatively heavy load.

In the above described embodiment it is the outer edges of the mounting contacts which cooperate with the inner edges of the unit contacts. However, this arrangement can be reversed by placing the unit contacts close to each other and having them embraced by the mounting contacts.

Another embodiment of my invention is shown in Figs. 8 to 11 in which the interlocking contact members serve to establish electrical connection between just one side of the lamp bulb and the power source, separate means being provided to connect the other side of the lamp bulb to the power source. Also, a somewhat different arrangement of interlocking contact members is shown, the wedging action taking place in a direction which is perpendicular to the plane of the mounting and base plates.

In this embodiment, the lamp unit is designated by the reference numeral 40 and the mounting plate by the reference numeral 41. The mounting plate in this instance is made from sheet metal and may be secured to the wall of a truck by one or more mounting screws 42. The lamp unit 40 comprises a metal base plate 43 to which a transparent housing 44 is suitably secured by means of screws 49. The metal base plate 43 is provided with an upstanding rim 45 which is provided with outwardly extending flanges 46, which correspond to the unit contacts of the previously described embodiment. The housing 44 seats itself within the rim 45 so as to reduce the lateral strain on the screws 49.

The metal mounting plate 41 is similarly provided with a rim 47 having inwardly directed flanges 48 which overhang the flanges 46 and cooperate therewith to establish both mechanical and electrical connection. The flanges 48 correspond to the mounting contacts of the previously described embodiment.

The mounting plate is also provided with longitudinal ridges 50 which may be in the form of stamped corrugations as shown in Fig. 10. These ridges have sloping end portions 51. The cooperation between the flanges 46 and 48 and the ridges 50 provides a wedging action in a direction perpendiuclar to the plane of the plates 41 and 43, with the result that good electrical contact is provided. The sloping portions 51 serve to facilitate the wedging action, and the contact between the ridges 50 and the undersurface of the base plate 43 provides additional electrical connection between these two metallic members.

As shown in Fig. 11 the base plate 43 is stamped to provide an aperture and flange 52. A cup 53 is pressed into the flanged aperture and a rubber ferrule 54 is suitably mounted within the cup. The rubber ferrule is provided with a flange 55 which seats against the bottom of the cup and which serves as a diaphragm to provide a resilient mounting for a terminal button 56 which is suitably mounted within the rubber ferrule. Oppositely disposed from the terminal button 56 is a cooperating terminal button 57 which is mounted in a rubber bushing 58, the latter passing through and being secured in the metal mounting plate 41.

A lamp bulb 59 is suitably mounted on the base plate 43 by means of a socket 60. The latter includes a bracket 61 which supports a cup 62 in which is disposed a rubber ferrule 63 similar in shape and operation to the rubber ferrule 54. A conductor 64 provides electrical connection between the terminal button 56 and a similar terminal button mounted in ferrule 63 for engaging one of the terminals of the lamp bulbs 59.

In operation, it will be observed that the rim 47 is cut away at the right hand portion of the mounting plate 41 as viewed in Fig. 9 so as to permit sliding longitudinal movement of the lamp unit with respect to the mounting plate. As the lamp unit is brought into operative position in which the terminal buttons 56 and 57 are engaged with each other, one or more detents 65 formed in the base plate 43 drop into notches 66 formed in the ridges 50, thereby serving to lock the parts in their operative position. The resilient mounting of the terminal buttons 56 and 57 and particularly the former, causes good electrical contact between the two. It will be observed that the terminal buttons are rounded to facilitate movement of the lamp unit into operative position.

It will be understood that various modifications and changes in the embodiments of my invention described and illustrated herein may be made without departing from the spirit of my invention as defined in the appended claims.

I claim:

1. A vehicle light comprising a lamp unit and a mounting plate therefor, said lamp unit comprising a base plate, a lamp bulb mounted thereon, and a transparent housing secured to said base plate and cooperating with said base plate to completely enclose said lamp bulb, said base plate being provided with a pair of oppositely disposed substantially parallel edge portions, and said mounting plate being provided with a cooperating pair of inwardly directed marginal portions overhanging said exposed edge portions so as to interlock therewith, and permitting a straight line sliding engagement whereby said lamp unit may be slidably secured to said mounting plate, said mounting plate being provided with a ridge disposed between said inwardly directed marginal portions and being substantially parallel thereto, said ridge having a sloping portion and having a second portion extending into contact with said base plate and urging the exposed edge portion of said base plate into electrical contact with said inwardly directed marginal portions of said mounting plate, said sloping portions providing a wedging action in a direction perpendicular to the plane of said mounting plate so as to facilitate the insertion of said exposed edge portions beneath the inwardly directed portions of said mounting plate preparatory to sliding the parts into operative engagement, and means for providing an electrical circuit between said lamp bulb and a power source, said means including said exposed edge portions and said inwardly directed marginal portions.

2. A vehicle light comprising a replaceable lamp unit and a mounting plate therefor, said lamp unit comprising a substantially rectangular base plate, a lamp bulb mounted thereon with its axis substantially parallel to the plane of said base plate, and a transparent housing secured to said base plate to completely enclose said lamp bulb, said base plate being provided with a pair of oppositely disposed substantially parallel edge portions of a length substantially equal to the length of said base, and said mounting plate being provided with a cooperating pair of inwardly directed marginal portions overhanging said exposed edge portions so as to interlock therewith, and permitting a straight line sliding engagement in a direction parallel to the plane in which said lamp bulb axis is oriented whereby said lamp unit may be slidably secured to said mounting plate, and cooperative means carried by said base plate and said mounting plate for establishing an electrical connection with said lamp bulb when said lamp unit is slid into its operative position.

References Cited in the file of this patent

UNITED STATES PATENTS

| Number | Name | Date |
|---|---|---|
| Re. 16,254 | Leech et al. | Jan. 19, 1926 |
| 1,918,803 | Floraday | July 18, 1933 |
| 2,019,347 | Hovey | Oct. 29, 1935 |
| 2,069,239 | Fraser | Feb. 3, 1937 |
| 2,076,020 | Fraser | Apr. 6, 1937 |
| 2,093,806 | Dover | Sept. 21, 1937 |
| 2,195,189 | Sauer | Mar. 26, 1940 |
| 2,196,313 | Laursen | Apr. 9, 1940 |
| 2,228,333 | Abbott | Jan. 14, 1941 |
| 2,230,521 | Bolser | Feb. 4, 1941 |
| 2,296,369 | Richmond | Sept. 22, 1942 |